Figure 1:
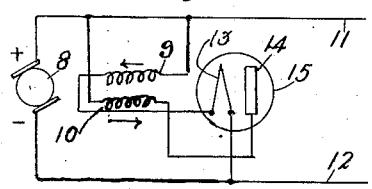

Oct. 17, 1933.  H. M. STOLLER  1,930,911
ELECTRIC REGULATOR
Filed July 12, 1918

Inventor:
Hugh M. Stoller:
by J. E. Roberts
Att'y.

Patented Oct. 17, 1933

1,930,911

UNITED STATES PATENT OFFICE 1,930,911

ELECTRIC REGULATOR

Hugh M. Stoller, New York, N. Y., assignor to Western Electric Company, Incorporated, New York, N. Y., a corporation of New York Application July 12, 1918. Serial No. 244,636

42 Claims. (Cl. 171—312)

This invention relates to a novel type of regulator which is applicable in general for the regulation of electrical circuits, and is particularly adapted to be employed for regulating the electrical output, such as the voltage or current, of a generator, or for controlling the electrical energy supplied to a motor in order that its speed may be regulated.

It is well known that aeroplanes are provided with radio signaling apparatus to provide communication between aeroplanes as well as between an aeroplane and a station on the ground. The signaling apparatus on an aeroplane requires electrical power for its operation and it is the custom to derive this power from a generator mounted on the aeroplane and driven by the wind, due to the motion of the aeroplane. The speed of the wind is far from constant and the generator is subject to large variations in speed which ordinarily would result in an undesirable fluctuation in the voltage generated. The novel feature of the regulator herein described is especially suitable for use on aeroplanes because it employs no moving parts, is light in weight, simple, automatic and efficient. While its advantage of being light in weight may not be of much importance if this regulator is used in some service other than aero service, the advantages of simplicity and good regulation still obtain.

The regulator provided according to the present invention is of the thermionic type, such as an audion comprising a vacuum tube containing electrodes. As is well known in the art, the cathode of a vacuum tube serves as a source of electrons that travel to the anode or plate electrode and the amount of this electron stream or space current depends upon several factors, primarily upon the voltage applied between these electrodes and also upon the temperature of the cathode, an increase in temperature producing a stronger space current. It is also well known that changes in the temperature of the cathode create much more than proportional changes of the space current of the tube, so that a vacuum tube may be made to respond very readily to changes in the temperature of the cathode.

In accordance with this invention a characteristic of an electrical machine such as the output of a generator may be regulated by connecting a field winding thereof in circuit with the cathode and anode of the vacuum tube, and by supplying the cathode with heating current directly from the generator. The temperature of the cathode and consequently the space current of the tube would then respond to changes in the voltage or current of the generator, so that the variations in the space current may so modify the current through the field winding as to bring about the desired regulation.

Figure 2:
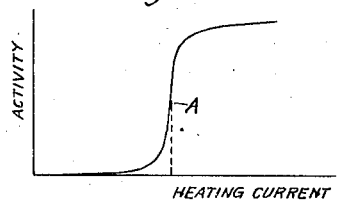
Figure 3:
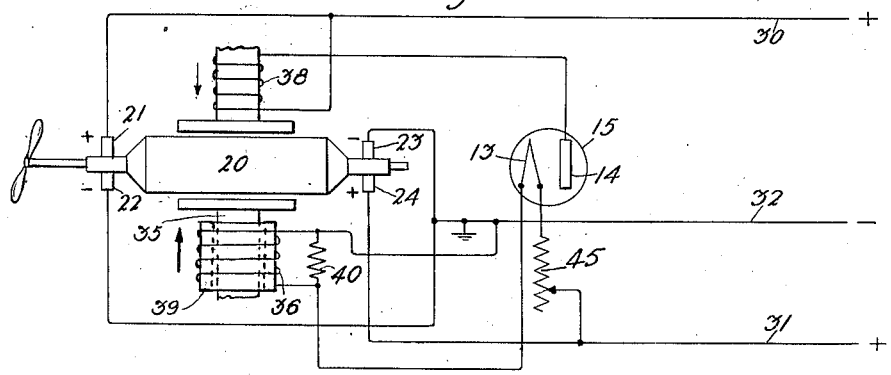
Figure 4:
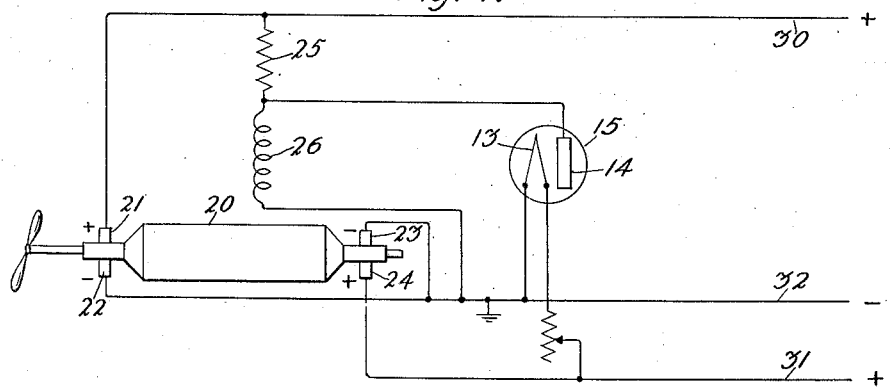
Figure 5:
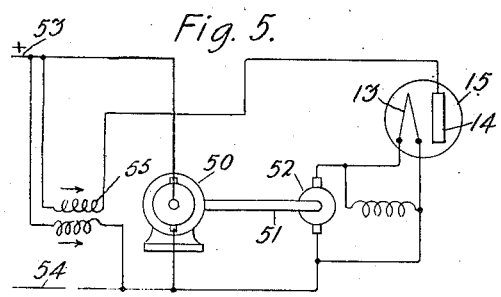
Figure 6:
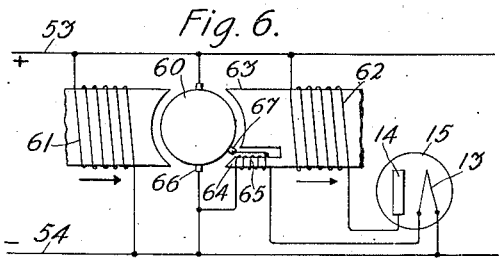

As the thermionic regulator may be associated with an electric machine in a variety of ways, several forms which this invention may assume will now be described in detail in connection with the drawing, in which Fig. 1 shows one embodiment of this invention where a tube of the two-electrode type is employed; Fig. 2 represents the characteristic curve for the thermionic activity of a cathode with respect to the various values of its heating current; Fig. 3 shows the thermionic regulator of this invention applied to a wind-driven generator; Fig. 4 is a modification of Fig. 3 in which only one field winding on the generator is employed; Fig. 5 shows how this invention may be applied to the regulation of the speed of a motor; and Fig. 6 is a modification of Fig. 5.

Referring more particularly to Fig. 1, 8 is a direct current shunt-wound generator having a main field winding 9 and an opposing or differential field winding 10. The circuit connections across leads 11 and 12 for the field winding 10 are completed by the space current path between the electrodes 13 and 14 of a vacuum tube 15. The cathode 13 is connected across leads 11 and 12 in series with field winding 9. The temperature of the cathode 13 consequently depends upon the voltage across leads 11 and 12 and will vary with changes in the output of the generator. The space current in the tube 15 and therefore the current through the differential winding 10 may be controlled by the output voltage of the generator through the intermediary of changes in the temperature of the cathode. If now the voltage of the generator 8 should tend to increase, due to a change in its speed or load for example, the current through the cathode 13 would tend to increase and will suffer a slight increase, which would create a much more than proportional increase in the space current of the tube, thereby increasing the current through the differential winding 10 and opposing the action of the main field winding 9 an amount sufficient to restrict the increase in the voltage of the generator to an unobjectionable amount. In a similar manner, a decrease in the voltage of the generator would decrease the thermionic activity of the cathode and decrease the differential field current by a more than proportional amount which would restrict the decrease in voltage to an unobjectionable amount. It therefore follows that the vacuum tube 15 would hold the output voltage of the generator 8 substantially constant regardless of wide changes in speed or changes in the load within a range which will depend upon the constants of the circuit.

As is well known, the thermionic activity of a filament with respect to its heating current has such a characteristic curve as is shown in Fig. 2. It is evident that it would be preferable that the main field winding 9 of Fig. 1 should be so designed that the thermionic activity of the filament for the mean voltage of the generator should be in the region of the steep portion of the characteristic curve of the cathode, such as at the point A.

In Fig. 3, 20 is a wind-driven generator having two high voltage brushes 21, 22, and two low voltage brushes 23, 24. The filament 13 of the vacuum tube 15 is in circuit with the main field winding 36 and the low voltage brushes 23, 24 of the generator 20, while the space current for the tube is supplied from the high voltage brushes 21 and 22 through an opposing winding 38. The thermionic activity of the cathode is therefore determined by the voltage of the generator. An increase in the voltage of the generator beyond its mean value would increase the space current of the tube and the current of the opposing field winding 38 to a much greater extent, thereby restricting the increase in current through the main field winding and filament and bringing about the desired restriction in the rise of the voltage. In a similar manner, a decrease in the voltage of the generator would decrease the action of the differential field winding 38, thereby restricting the decrease in the voltage of the generator. The variable resistance 45 which is included in series with the main winding 36 and filament 13 serves to determine at what value of the generator voltage the vacuum tube regulator will begin to operate. Thus the higher the value of this resistance the higher will be the minimum voltage at which regulation takes place.

In order to prevent a more or less continuous small fluctuation in the voltage of the generator, known in the art as hunting, which is due to over compensation and under compensation by the tube 15, it has been found preferable in some instances to connect a resistance 40 across the terminals of the main field winding 36. Since this resistance tends to make more steady the drop of potential across the terminals of field winding 36, it follows that small variations in the heating current supplied to the filament 13 would be considerably decreased. It has also been found that the use of a copper ring or sleeve around the pole piece of the main field winding greatly decreases the tendency of the regulator to hunt. Referring to the drawing, the pole piece 35 has around it a copper sleeve or ring 39 around which is wound the main field winding 36. The manner in which such an arrangement prevents hunting by a thermionic regulator may be explained as follows. It is well known in the art that the temperature of a cathode of a vacuum tube does not instantly respond to changes in its heating current, but that there is a certain time lag of the variations in temperature behind the variations in current supplied. Thus if the speed of the generator 20 would suddenly increase, thereby increasing the main field winding current and the filament current, the tube 15 would tend to overcompensate for the increase in speed, since the temperature of the cathode 13 would increase even after its current had begun to decrease. However, the damping action of the copper sleeve on the winding 36 would prevent the filament current from building up too quickly in response to sudden changes in the speed of the generator, thereby steadying the action of the tube.

As examples of electrical values that the apparatus in Fig. 3 may have, the following values are cited for a specific case in which the generator 20 was designed to deliver 275 volts across its high voltage brushes and 25 volts across its low voltage brushes. The main field winding 36 had 700 turns with a resistance of 16 ohms, while the differential field winding 38 had a resistance of 1300 ohms with 7000 turns. The resistance 40 had a value of 100 ohms. With such values it was found that with variations in speed of the generator from 4000 revolutions per minute to 14,000 revolutions per minute, the high voltage was maintained at practically 275 volts with a variation of less than one per cent, while the voltage across the low voltage brushes varied from 24 volts for the lower speed up to 28 volts for the highest speed, thereby varying the current supplied to filament 13 from 1.20 to 1.40 amperes. The change produced in the differential field current by variations in the space current of the tube 15 was from .015 at 4000 R. P. M. to .090 at 14,000 R. P. M. The values above cited, however, are not intended in any wise to serve as a limitation for this invention.

It will be noted in the above case that the ratio of high to low voltage decreased with increase in speed. It has been found that this ratio may be altered by taking advantage of the shifting of the magnetic neutral line of the field and locating the brush axes so as to effect the high and low brushes differently. By this means with increase in speed of the generator, over regulation, flat regulation or under regulation may be obtained for the high voltage. Thus it has been found if over regulation of the high voltage is desired, that is, if it is desired to have the high voltage increase slightly with increase in speed, the high voltage brushes as well as the low voltage brushes should be on the neutral magnetic axis for maximum speed. If a practically constant high voltage or flat regulation is desired, the high voltage brushes should be slightly back and the low voltage brushes slightly forward of the neutral axis for maximum speed. When under regulation or a decrease in the high voltage with increase in speed is desired, the high voltage brushes should be still somewhat farther back than for flat regulation, while the low voltage brushes should be shifted slightly forward. The amount the brushes should be shifted in each case may readily be determined by experiment.

In Fig. 4 the wind-driven generator 20 has, in series with its high voltage brushes, a resistance 25 and a field winding 26. The vacuum tube 15 is in shunt with the winding 26. The filament leads are in circuit with the low voltage brushes 23, 24. With such an arrangement it is evident that the thermionic activity of the cathode depends upon the voltage of the generator, since the generator itself is the source of current for the cathode. The temperature of the cathode will therefore change with changes in the voltage of the generator, due to changes in the wind velocity or due to a change in the load that may be connected to the generator by the leads 30, 32, or by the load across leads 31, 32. As in Fig. 1 the circuit should be so designed that the thermionic activity of the filament is on the steep portion of its characteristic curve. If then the voltage of the generator would suddenly increase, the space current of the tube 15 would increase, thereby shunting out a portion of the current through the field winding 26 and consequently limiting the voltage output of the generator. In a similar manner a decrease in voltage would decrease the space current and increase the field current, thereby limiting the decrease in the output voltage and maintaining the desired regulation.

Fig. 5 shows how this invention may be adapted for the regulation of the speed of a shunt-wound motor 50. On the same axle 51 with the motor is a small generator 52 which supplies current to the cathode 13 of the vacuum tube 15. Space current for the tube is supplied from the leads 53, 54 which also supply the motor 50. 55 is an aiding winding in series with electrodes of the vacuum tube 15. If now the speed of the motor would tend to increase, due to an increase in the voltage across the leads 53, 54, the speed of the generator 52 would likewise tend to increase, thereby increasing the filament current through the vacuum tube 15 and hence the space current through aiding winding 55, and thus restricting the rise in speed of the motor 50. Likewise, a decrease of the voltage supplied to the motor would decrease the filament current of the tube and the current flowing through the aiding winding, so that the speed of the motor may be maintained at the desired value.

Fig. 6 illustrates another form that this invention may take in being applied to the regulation of the speed of the direct current motor 60 which is a shunt-wound motor having a main exciting winding 61 and an auxiliary aiding winding 62. One pole 63 of the field magnet of the motor is shown slotted so as to form a separate pole piece 64 around which is a winding 65 shunted between one of the main brushes 66 and an additional brush 67. The winding 65 should preferably have more ampere turns than the winding 62. The motor therefore acts as a generator for supplying voltage across the terminals of this winding 65 which, as shown, may be also connected to heat the cathode 13 of the thermionic regulator 15. The anode of this vacuum tube is shown connected to a terminal of the aiding winding 62. The manner in which the vacuum tube 15 may regulate the speed of the motor 60 may be explained as follows: When the voltage across the leads 53, 54 would increase, for example, thereby tending to speed up the motor, the voltage generated across the brushes 66, 67 would likewise increase, thereby increasing the temperature of the cathode 13. This temperature change would produce a more than proportional increase in the space current of the vacuum tube so that the current through the aiding winding 62 would likewise be greater. This increase in the current through the auxiliary winding would tend to strengthen the motor field, thereby restricting the increase in motor speed. In a similar manner, if the voltage across the leads 53, 54 would decrease in value, the thermionic regulator 15 would decrease the current through the field winding 62, thereby weakening the field and restricting the reduction of the speed.

It is obvious that this invention is not limited to the particular forms above described, but that they may be considerably modified without departing in any wise from the spirit of this invention, as defined in the appended claims.

What is claimed is:

1. The combination with an electric machine having an armature and a field winding, of means for regulating a characteristic of said machine comprising an auxiliary field winding and a thermionic device in circuit with said auxiliary winding.

2. The combination with an electric machine having an armature winding and a field winding, of means for holding substantially constant a characteristic of said machine, said means comprising an opposing field winding, a thermionic device in circuit with said opposing winding, and a circuit electrically connected to said machine for controlling said device according to said characteristic of the said machine.

3. The combination with an electric machine having armature and field windings, of means responsive to a condition of said machine for regulating said field winding to control a characteristic of said machine, said means comprising a thermionic device in circuit with said field winding and containing an electrode adapted to be made thermonically active by current from said machine.

4. The combination with an electric machine having armature and field windings, of means for holding substantially constant a characteristic of said machine, said means being responsive to a condition of said machine and comprising a thermionic device having a plurality of electrodes, one of which electrodes is made thermionically active by current from said machine and two of which electrodes are connected to said field winding by fixed circuit connections.

5. The combination with an electric machine having a field winding, of means responsive to a condition of said machine for regulating said machine, said means comprising an auxiliary field winding and a thermionic device associated with said machine, said thermionic device having a plurality of electrodes, one of which electrodes is made thermionically active by current from said machine and two of which electrodes are connected to said auxiliary field winding by fixed circuit connections.

6. The combination with an electric machine having a field winding, of means responsive to a condition of said machine for holding substantially constant a characteristic of said machine, said means comprising an auxiliary field winding and a thermionic device associated with said machine, said device containing an electrode adapted to be made thermionically active by current from said machine.

7. The combination with a direct current generator having a field winding, of means for holding substantially constant the voltage of said generator, said means comprising an auxiliary field winding and a thermionic device in circuit with the terminals of said generator.

8. The combination with a direct current generator having a field winding, of means responsive to the voltage of said generator for regulating said voltage, said means comprising an auxiliary field winding and a thermionic device associated with said generator, said device containing an electrode adapted to be made thermionically active by current from said generator.

9. The combination with a direct current generator having armature and field windings, of a thermionic device associated therewith and having a thermionic cathode, said device being supplied in series with said field windings with space current from said generator, and said cathode being supplied with heating current from said generator.

10. The combination with an electric machine having armature and field windings, of means for regulating said machine, said means comprising a vacuum tube associated therewith and having a thermionic cathode, said tube being supplied in series with said field winding with space current from said machine, said cathode being supplied with heating current from said generator.

11. The combination with an electric machine having a plurality of windings, of a thermionic device containing an anode and a cathode, said cathode being in circuit with one of said windings, said anode and cathode being in circuit with another of said windings.

12. The combination with an electric generator having a main field winding and an auxiliary opposing winding, of a thermionic device containing an anode and a cathode, said cathode being in circuit with one of said windings, said anode and cathode being in circuit with the other of said windings.

13. The combination with an electric machine having a plurality of windings, of means for regulating said machine, said means comprising a thermionic device associated therewith and containing an anode and a cathode, said cathode being in circuit with one of said windings, and said anode and cathode being in circuit with another of said windings.

14. The combination with a direct current generator having a main field winding and an auxiliary opposing winding, of means for holding substantially constant the voltage from said generator, said means comprising a vacuum tube associated therewith and containing an anode and a cathode, said cathode being in circuit with one of said windings, said anode and cathode being in circuit with the other of said windings.

15. The combination with an electric generator having relatively high voltage terminals and relatively low voltage terminals, of a vacuum tube containing an anode and a cathode, means for supplying voltage to said anode and cathode from said high voltage terminals, and means for supplying said cathode with heating current from said low voltage terminals.

16. The combination with a direct current generator having relatively high voltage terminals and relatively low voltage terminals, of means for regulating said generator, said means comprising a vacuum tube containing an anode and a cathode, means for supplying voltage to said anode and said cathode from said high voltage terminals, means for supplying said cathode with heating current from said low voltage terminals.

17. The combination with a direct current generator having a main field winding and an auxiliary opposing field winding, and having relatively high voltage terminals and relatively low voltage terminals, of means for holding substantially constant the voltage of said generator, said means comprising a vacuum tube containing an anode and cathode, means for supplying voltage to said cathode and anode from said high voltage terminals, and means for supplying said cathode with heating current from said low voltage terminals.

18. The combination with an electric generator having a main field winding and an auxiliary winding and having relatively high voltage terminals and relatively low voltage terminals, of a vacuum tube containing an anode and cathode, said anode and cathode being in circuit with one of said windings, said cathode being in circuit with the other of said windings, means for supplying voltage to said anode and said cathode from said high voltage terminals, and means for supplying said cathode with heating current from said low voltage terminals.

19. The combination with a direct current generator having a main field winding and an auxiliary winding and having relatively high voltage terminals and relatively low voltage terminals, of a vacuum tube containing an anode and cathode, said auxiliary winding being in series with said anode and cathode, said main field winding being in series with the terminals of said cathode, means for supplying voltage to said anode and cathode from said high voltage terminals, and means for supplying said cathode with current from said low voltage terminals.

20. The combination with a direct current generator having a main field winding and an auxiliary opposing winding and having relatively high voltage terminals and relatively low voltage terminals, of means for regulating the voltage of said generator, said means comprising a vacuum tube containing an anode and a cathode, said opposing winding being in series with said anode and cathode, said main field winding being in series with the terminals of said cathode, means for supplying voltage to said anode and cathode from said high voltage terminals, and means for supplying said cathode with heating current from said low voltage terminals.

21. The combination with an electric machine having a main field winding wound on one of the pole pieces of said machine and an auxiliary winding on another pole piece of said machine, of means associated with said auxiliary winding for regulating said machine, and means for preventing said first named means from hunting, said second named means comprising a metallic sleeve on only that pole piece around which the main field winding is wound.

22. The combination with an electric machine having a main field winding wound on one of the pole pieces of said machine and an auxiliary winding on a second pole piece of said machine, of a thermionic regulator for said machine, and means for preventing said regulator from hunting, said means comprising a metallic sleeve around only that pole piece around which the main winding is wound.

23. The combination with a direct current generator having a field winding of means for keeping substantially constant a characteristic of said generator, said means comprising a vacuum tube regulator connected in circuit with the field winding of said generator, said tube having a thermionic cathode and means for supplying electrical energy from the generator to said cathode which varies in intensity in accordance with the characteristic of said generator to be regulated.

24. The combination of a generator having an exciting winding of a thermionic regulator therefor, said regulator comprising a vacuum tube having a cathode in circuit with said winding, and a resistance in circuit with said cathode and said winding.

25. The combination with a generator, of means for controlling the excitation of said generator comprising a field winding circuit, a hot cathode vacuum tube connected to said field winding circuit to receive space current therefrom, and means for heating the cathode of said tube in response to variations in a characteristic of the generator.

26. A regulating system for an electric circuit comprising a dynamo electric machine adapted to regulate by variations in its excitation a condition of said circuit, a vacuum tube having a cathode arranged to be supplied with a heating current that varies with variations in the condition being regulated and an anode, means for impressing across the anode and cathode a higher voltage than the voltage of said circuit, and a field winding for said machine connected in series with said anode and cathode.

27. A regulating system for an electric circuit comprising a dynamo electric machine adapted to regulate by variations in its excitation a condition of said circuit, a vacuum tube havng a cathode arranged to be supplied with a heating current that varies with variations in the condition being regulated and an anode, means for impressing across said anode and cathode a higher voltage than the voltage of said circuit, and means responsive to the space current of said tube for varying the excitation of said machine.

28. The combination with a dynamo electric machine, of a valve having a filament therein affected by current generated by said machine in a closed loop circuit including the filament one point of which circuit is connected to the negative pole of the dynamo.

29. The combination with a dynamo electric machine, of a thermionic means having a filament and generating means for producing current in response to the movement of the dynamo, said generating means and the filament of the thermionic means being disposed in a closed loop circuit, one point of which circuit is connected to the negative pole of the dynamo.

30. In a device of the character described comprising a dynamo electric machine, a valve having a filament therein affected by current generated by said machine in a closed loop circuit including the filament, one point of which circuit is connected to the negative pole of the dynamo, and controlling the voltage of said dynamo electric machine.

31. The combination of a generator having a shunt field, a differential winding, a thermionic means including a uni-laterally conductive valve tube of the incandescent cathode type having a filament therein affected by current generated by said machine in a closed loop circuit including the filament, one point of which circuit is connected to the negative pole of the dynamo, the anodic plate of the valve being connected in a circuit with the differential winding, whereby at a predetermined speed, an increase of current will be effective through the differential winding to maintain a relatively constant voltage of the generator.

32. An electrical apparatus comprising a dynamo, an armature winding therefor, a differential winding, thermionic means having a filament therein affected by current, a closed loop circuit in which said filament is disposed, a connection between one part of said circuit and the negative pole of the dynamo, and a connection between another part of said circuit and the differential winding.

33. In a dynamo electric machine comprising an armature, a field winding therefor, a counter field, a thermionic means having a filament therein affected by current generated by said machine in a closed loop circuit including the filament, one point of which circuit is connected to the negative pole of the dynamo and having an incandescent cathode and an anodic plate connected respectively with said windings, for effecting voltage control of the said dynamo electric machine.

34. The combination of a dynamo electric machine having a shunt field, and thermionic means associated therewith for effecting voltage regulation, and having a filament therein affected by current generated by said machine in a closed loop circuit including the filament, one point of which circuit is connected to the negative pole of the dynamo.

35. A regulating system comprising a dynamo-electric machine having armature and field windings, a space discharge device having electrodes, fixed circuit connections between said device and said field winding for controlling the current flow through said field winding according to the space current flow through the device, and means comprising a circuit between said machine and an electrode of said device for exerting a control of the operation of said electrode dependent each instant upon the value of a characteristic of said machine to control the space current flow through said device and maintain the machine characteristic substantially constant.

36. A regulating system comprising a generator having armature and field windings, a space discharge device having electrodes, fixed circuit connections between said device and said field winding for controlling the current flow through said field winding according to the space current flow through the device, and means comprising a circuit between the generator terminals and an electrode of said device for exerting a control of the operation of said electrode dependent each instant upon the generator voltage to control the space current flow through said device and maintain the generator voltage substantially constant.

37. A regulating system comprising a dynamo-electric machine having armature and field windings, a space discharge device having electrodes including a filamentary cathode, fixed circuit connections between said device and said field winding for controlling the current flow through said field winding according to the space current flow through the device, and means comprising a fixed circuit between said machine and an electrode of said device for exerting a control of the operation of said electrode dependent each instant upon the instantaneous value of a characteristic of said machine to control the space current flow through said device and maintain the machine characteristic substantially constant.

38. A regulating system comprising a generator having armature and field windings, a space discharge device having electrodes including a filamentary cathode, fixed circuit connections between said device and said field winding for controlling the current flow through said field winding accord ng to the space current flow through the device, and means comprising a fixed circuit between said generator and an electrode of said device for exerting a control of the operation of said electrode dependent each instant upon the generator instantaneous voltage to control the space current flow through said device and maintain the generator voltage constant.

39. In combination an electric circuit connected to a source of current, regulator means comprising a space discharge device controlled from said circuit for maintaining substantially constant voltage on said circuit, and means associated with said regulator means for preventing hunting action.

40. In combination an electric circuit connected to a source of current and having output terminals, regulator means comprising a space discharge device controlled from said circuit for maintaining substantially constant a characteristic of the output current from said circuit, and means associated with said regulator means for preventing hunting action.

41. The combination with an electric machine having an exciting winding, of a vacuum tube having a filamentary cathode in circuit with said winding, and means for varying the temperature of said cathode in response to fluctions in a characteristic of said machine for controlling said exciting winding to reduce said fluctions to a small value.

42. In combination, an electric circuit, an electric machine in said circuit and having an exciting winding, a thermionic regulator having a cathode in circuit with said winding, and means responsive to fluctions in a characteristic of said circuit for supplying a variable heating current to said cathode whereby said fluctions are reduced to a low value.

HUGH M. STOLLER.